United States Patent
Bortun et al.

(10) Patent No.: US 7,442,310 B2
(45) Date of Patent: Oct. 28, 2008

(54) TREATING LIQUIDS WITH PH ADJUSTER-BASED SYSTEM

(75) Inventors: Anatoly I. Bortun, Easton, PA (US); Mila N. Bortun, Easton, PA (US); Francis J. Fischer, Easton, PA (US)

(73) Assignee: Magnesium Elektron, Inc., Flemington, NJ (US)

( * ) Notice: Subject to any disclaimer, the term of this patent is extended or adjusted under 35 U.S.C. 154(b) by 163 days.

(21) Appl. No.: 11/609,933

(22) Filed: Dec. 13, 2006

(65) Prior Publication Data
US 2007/0095758 A1    May 3, 2007

Related U.S. Application Data

(60) Division of application No. 10/958,754, filed on Oct. 5, 2004, now Pat. No. 7,169,297, and a continuation-in-part of application No. 10/195,630, filed on Jul. 15, 2002, now Pat. No. 6,960,328, and a continuation-in-part of application No. 10/195,875, filed on Jul. 15, 2002, now Pat. No. 7,252,767, and a continuation-in-part of application No. 10/195,876, filed on Jul. 15, 2002, now Pat. No. 6,936,175.

(60) Provisional application No. 60/591,250, filed on Jul. 26, 2004.

(51) Int. Cl.
  *B01D 15/00* (2006.01)
(52) U.S. Cl. ........................................ 210/669; 210/688
(58) Field of Classification Search ................. 210/669, 210/688, 681, 683
See application file for complete search history.

(56) References Cited

U.S. PATENT DOCUMENTS

| | | | |
|---|---|---|---|
| 1,993,142 A | 3/1935 | Johnson |
| 2,207,725 A | 7/1940 | Elvove |
| 2,349,243 A | 5/1944 | Bates |

(Continued)

FOREIGN PATENT DOCUMENTS

FR    1 317 359    1/1963

(Continued)

OTHER PUBLICATIONS

Sporlan Corp Bulletin 40-10, "Catch-All" Liquid and Suction Line Filter-Driers, Mar. 2003, pp. 1-10 and 25 of 32 (downloaded from http://www.sporlan.com/40-10.pdf on Jan. 7, 2008).*

(Continued)

*Primary Examiner*—Chester T. Barry
(74) *Attorney, Agent, or Firm*—Pearne & Gordon LLP (57) ABSTRACT

The invention features a system for treating liquid including a liquid treatment device comprising adsorbent media for removing a substance from liquid and a pH adjuster device located upstream of the liquid treatment device relative to a direction of flow of the liquid. The pH adjuster device contains particulate or solid state pH adjuster material capable of releasing H or OH groups into the liquid or consuming H or OH groups from the liquid effective to raise or lower the pH of the liquid while it passes through the media. The pH adjuster may include acidifier or basifier material. Also featured is a method of using the device to remove a substance from liquid by adsorption and/or ion exchange.

13 Claims, 4 Drawing Sheets

U.S. PATENT DOCUMENTS

| | | | |
|---|---|---|---|
| 3,056,502 A | 10/1962 | Zwicky | |
| 3,056,647 A | 10/1962 | Amphlett | |
| 3,046,819 A | 11/1962 | Jones | |
| 3,130,147 A | 4/1964 | Dwyer | |
| 3,289,847 A | 12/1966 | Rothermund | |
| 3,375,933 A | 4/1968 | Rodman | |
| 3,415,382 A | 12/1968 | Martin | |
| 3,416,884 A | 12/1968 | Stynes et al. | |
| 3,485,763 A | 12/1969 | Lefevre et al. | |
| 3,692,496 A | 9/1972 | Greenwood et al. | |
| 3,850,835 A | 11/1974 | Marantz et al. | |
| 4,021,339 A | 5/1977 | Foody | |
| 4,025,608 A | 5/1977 | Tawil et al. | |
| 4,104,170 A | 8/1978 | Nedza | |
| 4,110,081 A | 8/1978 | Millar et al. | |
| 4,212,743 A | 7/1980 | Van Meter et al. | |
| 4,366,064 A | 12/1982 | Mihelic et al. | |
| 4,381,289 A | 4/1983 | Nowell et al. | |
| 4,415,677 A | 11/1983 | Lee et al. | |
| 4,512,905 A | 4/1985 | Clearfield et al. | |
| 4,526,765 A | 7/1985 | Ito et al. | |
| 4,609,465 A | 9/1986 | Miller | |
| 4,643,836 A | 2/1987 | Schmid | |
| 4,664,812 A | 5/1987 | Klein | |
| 4,695,642 A | 9/1987 | Derouane et al. | |
| 4,711,718 A | 12/1987 | Nelson, Jr. | |
| 4,761,232 A | 8/1988 | Bright | |
| 4,806,517 A | 2/1989 | Vanderpool et al. | |
| 4,826,663 A | 5/1989 | Alberti et al. | |
| 4,883,599 A | 11/1989 | Lindahl et al. | |
| 4,894,149 A | 1/1990 | Block | |
| 4,902,426 A | 2/1990 | Macedo et al. | |
| 4,902,427 A | 2/1990 | Szezepanik | |
| 5,002,749 A | 3/1991 | Recansens | |
| 5,072,031 A | 12/1991 | Hellring | |
| 5,082,568 A | 1/1992 | Holler | |
| 5,116,499 A | 5/1992 | Deibel | |
| 5,210,363 A | 5/1993 | Sweeney | |
| 5,279,733 A | 1/1994 | Heymans | |
| 5,290,443 A | 3/1994 | Norton | |
| 5,328,609 A | 7/1994 | Magnusson et al. | |
| 5,510,029 A | 4/1996 | Benian | |
| 5,597,489 A | 1/1997 | Schneider et al. | |
| 5,690,806 A | 11/1997 | Sunderland et al. | |
| 5,700,371 A | 12/1997 | Koslow | |
| 5,730,879 A | 3/1998 | Wilding et al. | |
| 5,885,463 A | 3/1999 | Carriero | |
| 6,042,731 A | 3/2000 | Bonnin | |
| 6,054,059 A | 4/2000 | Latimer, Jr. et al. | |
| 6,077,809 A | 6/2000 | Suzuki et al. | |
| 6,143,106 A | 11/2000 | Shane | |
| 6,260,372 B1* | 7/2001 | Burke | 62/292 |
| 6,264,845 B1 | 7/2001 | Higby et al. | |
| 6,283,308 B1 | 9/2001 | Patil et al. | |
| 6,322,704 B1 | 11/2001 | Martin | |
| 6,326,328 B1 | 12/2001 | Matsuzawa | |
| 6,379,641 B1 | 4/2002 | Bedard et al. | |
| 6,391,278 B1 | 5/2002 | Pinnavaia et al. | |
| 6,475,386 B1 | 11/2002 | Carr et al. | |
| 6,602,919 B1 | 8/2003 | Collins | |
| 6,613,230 B2 | 9/2003 | Krulik et al. | |
| 6,712,977 B1 | 3/2004 | Okaue | |
| 6,861,248 B2 | 3/2005 | Dale et al. | |
| 2002/0030017 A1 | 3/2002 | Martin | |
| 2002/0179521 A1 | 12/2002 | Paul | |
| 2003/0103888 A1 | 6/2003 | Hai et al. | |
| 2003/0196960 A1 | 10/2003 | Hughes | |
| 2003/0196966 A1 | 10/2003 | Hughes | |
| 2004/0050795 A1 | 3/2004 | Park et al. | |

FOREIGN PATENT DOCUMENTS

| | | |
|---|---|---|
| JP | 62-226807 | 10/1987 |
| JP | 5-17112 | 1/1993 |

OTHER PUBLICATIONS

Structure of zirconium phosphate gels produced by the sol-gel method, S.G. Bogdanov et al., J. Phys.: Codens, Matter 9 (1997), pp. 4031-4039.

The effect of mineralizers on the crystallization of zirconia gel under hydrothermal conditions, G. Dell'Agli et al., Solid State Ionics 123 (1999) pp. 87-94.

Preparation of stable, high surface area zirconia, K.S. Chan et al., J. Mat. Science, 12, N21, 1579-1581 (1994).

Scientific bases for the synthesis of highly dispersed framework zirconium phosphate catalysts for paraffin isomerization and selective oxidation, Sadykov et al., Kinetics and Catalysis, vol. 42, No. 3 (2001), pp. 391-398.

Preparation and sorption properties of spherical polyacrylamide-zirconium phosphate ion-exchanger, Chao-Yeuh Yang et al., Separation Science and Technology, 18(1), pp. 83-91, 1983.

Sol-gel preparation of nanostructured adsorbents, Y.S. Lin and S.G. Deng, Adsorption and its Application in Industry and Environmental Protection Studies in Surface Science and Catalysts, vol. 120, pp. 653-686, 1998.

International Search Report dated Oct. 30, 2003.

Preparation and characterization of mesoporous, high-surface-area zirconium (IV) oxide, Michael J. Hudson and James A. Knowles, J. Mater. Chem., 1996, 6(1), pp. 89-95.

Parameter control in the synthesis of ordered porous zirconium oxide, Han-Rong Chen et al., Materials Letters 51 (Nov. 2001), pp. 187-193.

Preparation of zirconia powder by the pyrolysis of active carbon, M. Ozawa and M. Kimura, Journal of Material Science Letters 9 (1990), pp. 446-448.

Effects of chemical species on the crystallization behavior of a sol-derived zirconia precursor, C.L. Ong et al., J. Am. Ceram. Soc. 81(10), pp. 2624-2628 (1998).

Morphology of zirconia synthesized hydrothermally from zirconium oxychloride, Bruno Mottet et al., J. Am. Ceram Soc., 75(9), pp. 2515-2519 (1992).

Microwave-hydrothermal synthesis of nancrystalline zirconia powders, Federica Bondioli et al., J. Am. Ceram. Soc., 84(11), pp. 2728-2730 (2001).

Highly ordered porous zirconia from surfactant-controlled synthesis: Zirconium oxide-sulfate and zirconium oxo phosphate, Ulrike Ciesla et al., Chem. Mater, 1999, vol. 11, No. 2, pp. 227-234.

Inorganic ion exchange materials group IV hydrous oxides-synthetic inorganic ion exchangers, Chapter 5, Abraham Clearfield, Ph.D.Ed., CRC Press, Inc., 1982, pp. 141-160.

The preparation of crystalline zirconium phosphate and some observations on its ion exchanger behavior, A. Clearfield and J.A. Stynes, J. Inorg. Nucl. Chem., vol. 26, 1964, pp. 117-129.

New crystalline phases of zirconium phosphate possessing ion-exchange properties, A. Clearfield et al., J. Inorg. Nucl. Chem., 1968, vol. 30, pp. 2249-2258.

Uptake of inorganic acids on hydrogeis of tetravalent hydroxides and its application for the preparation of some inorganic sorbents, R. Caletka et al., Journal of Radioanalytical Chemistry, vol. 30 (1976), pp. 155-172.

Synthesis and study of new compounds (M1)(NIV)2(PO4)3 with Nasicon-like structure (M=AG, Cu; N=GE H, Sn, Ti, Zr), J.M. Winand et al., Journal of Solid State Chemistry 107 (1993), pp. 356-361.

Preparation of porous resin loaded with crystalline hydrous zirconium oxide and its application to the removal of arsenic, T.M. Suzuki et al., Reactive & Functional Polymers 43 (2000), pp. 165-172.

Hydrothermal preparation of the low-expansion NZP family of materials, Sridhar Komameni, Int. J. High Technology Ceramics 4 (1988), pp. 31-39.

Structure of the active sites on H3PO4/ZrO2 catalysts for dimethyl carbonate synthesis from methanol and carbon dioxide, Yoshiki Ikeda et al., J. Phys. Chem. B, 2001, 105, pp. 10653-10658.

A novel layered zirconium phosphate Zr2O3(HPO4) synthesis and characterization of properties, Anatoly Bortun et al., Solvent Extraction and Ion Exchange, 15(2), pp. 305-328 (1997).

Synthesis of semicrystalline materials by organic compound intercalation into amorphous titanium phosphate, Anatoly Bortun and V.V. Strelko, Chem Mater, 1995, 7. pp. 249-251.

31P-MASNMR-Spectroscopic studies with zirconium phosphate catalysts, Koh-Ichi Segawa et al., Journal of Catalysis 101, pp. 81-98 (1986).

P solid-state NMR studies of the structure of amine-intercalated a-zirconium phosphate, reaction of a-zirconium phosphate with excess amine, D.J. MacLachlan, J. Phys. Chem., 1990, pp. 7656-7661.

Preparation and characterization of a new 3-dimensional zirconium hydrogen phosphate, T-Zr(HPO4)2, Determination of the complete crystal structure combining synchrotron X-ray single-crystal diffraction and neutron powder diffraction, Anne Marie Krough Anderson, Inorg. Chem. 1998, 37, pp. 876-881.

Proton conductivity and humidity-sensing properties at high temperature of the NASICON-based composite material HZr2P4O12ZrP2O7, Shouhua Feng et al., Chem. Mater., 1993, 5, pp. 1277-1282.

Zirconium deficiency in NASICON-type compounds: crystal structure of NA5Zr(PO3)3, J.P. Boilot et al., Journal of Solid State Chemistry, 50, pp. 91-99 (1983).

Hydrothermal synthesis and characterisation of crystalline sodium zirconium phosphates, M.K. Dongare et al., Mat. Res. Bull., vol. 27, pp. 637-645 (1992).

Zirconium and hafnium hydroxo-orthophosphates, N.G. Chemorukov et al., Russian Journal of Inorganic Chemistry, 28(7) 1983, pp. (unknown).

International Search Report dated Oct. 2, 2003.

The sorption of first-row transition metal ions on a zirconium phosphate gel of low crystallinity and study of the reproducibility of the gel, Sten Ahrland et al., J. Inorg, Nucl. Chem., 1970, vol. 32, pp. 2069-2078.

Direct hydrothermal synthesis of zirconium phosphate and zirconium arsenate with a novel basic layerd structure in alkaline media, Abraham Clearfield et al., Inorganic Chemistry Communications 1 (1998) pp. 206-208.

Solid-state nuclear magnetic resonance spectroscopic study of γ-zirconium phosphate, Nigel Claydon, J. Chem. Soc., Dalton Trans. (1987), pp. 1877-1881.

Influence of precipitating agent and digestion on the morphology and microstructure of hydrous zirconia, G.K. Chuah et al., Journal of Catalysis 175, pp. 80-92 (1998) Article No. CA981980.

Ion exchange properties of TIN (IV) materials-1, Hydrous (TIN)IV) oxide and its cation exchange properties, J.D. Donaldson et al., J. Inorg. Nucl. Chem., 1968, vol. 30, pp. 1083-1092.

Preparation and sorption of spherical polyacrylamide-zirconium phosphate ion-exchanger, Chao-Yeuh Yang et al., Separation Science and Technology, 18(1), pp. 83-91 (1983).

On the synthesis of a-zirconium phosphate, Camino Trobajo et al., Chem. Mater. 2000, 12, 1787-1790.

Synthetic inorganic ion exchangers, Vesely, V. and Pekarek, V., Talanta, 1972, vol. 19, pp. 219-262.

On the synthesis of a-zirconium phosphate, Camino Trabajo et al., Chem. Mater., 2000, vol. 12, pp. 1787-1790.

Galvanic cell type humidity sensor with NASICON-based material operative at high temperature, Feng et al., Chem. Mater. 1992, vol. 4, pp. 1257-1262.

Crystalline insoluable salts of polybasic metals—II, Synthesis of crystalline zirconium or titanium phosphate by direct precipitation, G. Alberti et al., J. Inorg. Chem., vol. 30, pp. 317-318, 1968.

P MAS NMR Investigations of crystalline and glassy NASICON—Type phosphates, K.C. Sobha et al., Journal of Solid State Chemistry, vol. 121, pp. 197-201 (1996).

Inorganic ion exchangers, C. B. Amphlett, Elsevier Publishing Company, New York, (1964), pp. 92-95.

Abstract translation of attached Russian article for chemistry role in the environmental protection, V.V. Streklo, Naukova Dumka, Kiev, (1982), pp. 179-188.

* cited by examiner

TREATING LIQUIDS WITH PH ADJUSTER-BASED SYSTEM

CROSS-REFERENCE TO RELATED APPLICATIONS

This application is a division of U.S. patent application Ser. No. 10/958,754 filed Oct. 5, 2004, which is incorporated herein by reference in its entirety.

U.S. patent application Ser. No. 10/958,754 claims the benefit of U.S. Provisional Patent Application No. 60/591,250 filed Jul. 26, 2004, now expired. U.S. patent application Ser. No. 10/958,754 is also a continuation-in-part of U.S. patent application Ser. No. 10/195,630 filed Jul. 15, 2002, now U.S. Pat. No. 6,960,328 issued Nov. 1, 2005; Ser. No. 10/195,875 filed Jul. 15, 2002, currently pending; and Ser. No. 10/195,876 filed Jul. 15, 2002, now U.S. Pat. No. 6,936,175 issued Aug. 30, 2005; all of which are incorporated herein by reference in their entireties.

FIELD OF THE INVENTION

This invention relates to removing substances from liquids and, in particular, to removing dissolved contaminants from liquids.

BACKGROUND OF THE INVENTION

It is believed that most, if not all, adsorbent medias conventionally used in arsenic removal service are adversely affected by high pH. While this can be addressed on a large scale in central water treatment systems by typical pH adjustment methods, such as the addition of a solution of acid to the feed liquid, a good method for adjusting pH in conjunction with a water treatment device for a household does not exist.

Adding chemicals to liquids to adjust pH is problematic. It is expensive and may raise regulatory concerns in connection with drinking water. In general, for pH lowering, sulfuric acid, hydrochloric acid, or carbon dioxide are used. For pH raising, solutions of sodium hydroxide, sodium carbonate, or a slurry of magnesium hydroxide are typically used. Inherent in any chemical addition system is a reliability issue. If there is a mechanical or electrical failure in the dosing system, or if the storage tank containing the acid is not periodically refilled, the pH will revert to the feed water pH. For arsenic removal, this means the consumer could ingest high arsenic water. For some adsorption medias (e.g., iron based adsorptive media), failure of the pH adjustment system may result in release of adsorbed arsenic into the product water.

The water treatment industry would benefit from a system that is more reliable in that it avoids using electromechanical dosing devices for releasing chemical solutions to adjust pH and avoids using storage tanks of solution that need refilling.

SUMMARY OF THE INVENTION

The present invention features a system for treating liquid comprising a pH adjuster located upstream of a liquid treatment device relative to a liquid flow direction. The liquid treatment device contains adsorbent media, meaning media that is adapted to remove a substance from the liquid by a mechanism including adsorption and/or ion exchange and, more specifically, by predominantly adsorption or predominantly ion exchange. The pH adjuster contains solid state or particulate pH adjuster material adapted to release H or OH groups into the liquid or adapted to consume H or OH groups from the liquid, at a generally fixed location relative to the liquid treatment device, effective to raise or lower the pH of the liquid while it passes through the media of the downstream liquid treatment device. In particular, the pH adjuster material is a nonbonded particulate. One suitable nonbonded particulate pH adjuster material is in the form of resin beads. Cast, molded or otherwise bonded pH adjuster material might also be suitable for use in the invention.

The pH adjuster may include particulate acidifier material capable of releasing protons into the liquid or consuming OH groups from the liquid effective to lower the pH of the liquid while it passes through the media of the downstream liquid treatment device. The acidifier material can be hydrolytically decomposed so as to consume OH in the feed liquid. Such suitable particulate acidifier material includes, but is not limited to, material selected from the group consisting of zirconium basic sulfate, zirconium basic carbonate, titanium basic sulfate, and combinations thereof. The acidifier material can operate by ion exchange substitution of protons into the feed liquid. Such suitable particulate acidifier material includes, but is not limited to, material selected from the group consisting of zirconium phosphates, zirconium silicates, titanium phosphates, cation exchange resins (e.g., carboxylic cation exchange resins and sulfocationic ion exchange resins), and combinations thereof. The acidifier is characterized by its ability to improve the performance of the media in the downstream liquid treatment device in removing anionic chemical species from liquids, including but not limited to those selected from the group consisting of arsenic, chromium(VI), selenium, boron, phosphates and combinations thereof.

The pH adjuster may include basifier material capable of consuming protons from the liquid or releasing OH groups into the liquid effective to raise the pH of the liquid while it passes through the media of the downstream liquid treatment device. The basifier is characterized by its ability to improve the performance of the downstream media in removing cationic chemical species from liquids, including, but not limited to, those selected from the group consisting of lead, cadmium, copper, barium, strontium, thallium and combinations thereof.

The inventive system may be used in point-of-use, point-of-entry and central water treatment services. In point-of-use (POU) service the system is used at specific locations inside a home such as at a drinking water source (e.g., under a kitchen faucet) for treating drinking water. In point-of-entry (POE) service a plurality of units in parallel, for example, 2-4 liquid treatment units, may be used to treat all the water of a home. In central water treatment service a bank of a plurality of units in parallel such as 10 to 20 liquid treatment units, may be used on a well or other water source to treat the water for a number of households.

Not all POE or central treatment systems need many units. The inventive system may comprise a first set of two or more axial flow pH adjuster devices in parallel relative to the flow of the liquid and a second set of two or more axial flow liquid treatment devices in parallel. The material of the pH adjuster and liquid treatment device has a relatively large particle size. The media of the second set of liquid treatment devices is selected from the group consisting of zirconium dioxide, granular ferric hydroxide, hydrous ferric oxides, sulfur modified iron, titanium dioxide, crystalline anatase, activated alumina, supports comprising hydrous zirconium oxides, supports comprising hydrous titanium oxides, and combinations thereof. Each liquid treatment device may be adapted for point-of-entry service and to contain a bed of the media having a depth of at least about 2 feet and a diameter of at least about 1 foot, the media having an average particle size of at least about 0.1 mm. Each liquid treatment device may be adapted for central liquid treatment service and to contain a bed of the media having a depth of at least about 4 feet and a diameter of at least about 4 feet, the media having an average particle size of at least about 0.1 mm.

The inventive system permits very high removal of chemical species over a long life of the device. The pH adjuster can operate as an acidifier or basifier and thus, may improve the performance of a variety of medias and enable efficient removal of a variety of chemical species in different liquids and applications. The present invention enables the pH of the feed liquid to be adjusted up or down as desired to suit the performance of the particular media. In addition, the invention provides a substantial improvement in the capacity of the media for removing dissolved chemical species by adsorption and/or ion exchange.

The present invention is advantageous in that chemical solutions are not added to the liquid to adjust pH. Such solutions travel with the influent and are rapidly consumed by it. By subjecting the liquid to solid state or particulate pH adjuster material contained at a generally fixed location relative to the liquid treatment device according to the present invention, the pH of the liquid can be adjusted in a controlled, generally consistent manner. This provides improved reliability in that electromechanical dosing devices are not required. Most importantly, because electromechanical dosing devices are not needed, the very serious danger in the event of their failure—ingestion of toxic solutions of drinking water from the very same media intended to remove the toxins and make consumers safe, is avoided in the present invention. Also avoided is the same danger that would occur if the tank of pH-adjusting solution runs out. Moreover, the present invention is usable under conditions that heretofore were too harsh to permit using adsorbents to remove contaminants. In environments in which adding chemical solutions to adjust pH is not feasible such as in single homes or a community of homes (POU or POE applications), many adsorbent medias are not commercially effective in removing contaminants in liquid having a pH over 9. In contrast, the present invention operates effectively and with improved capacity by lowering pH of such harsh environments to a level that enhances media performance.

Other embodiments of the invention are contemplated to provide particular features and structural variants of the basic elements. The specific embodiments referred to as well as possible variations and the various features and advantages of the invention will become better understood when considered in connection with the accompanying drawings and the detailed description that follows.

DETAILED DESCRIPTION

Figure 1:
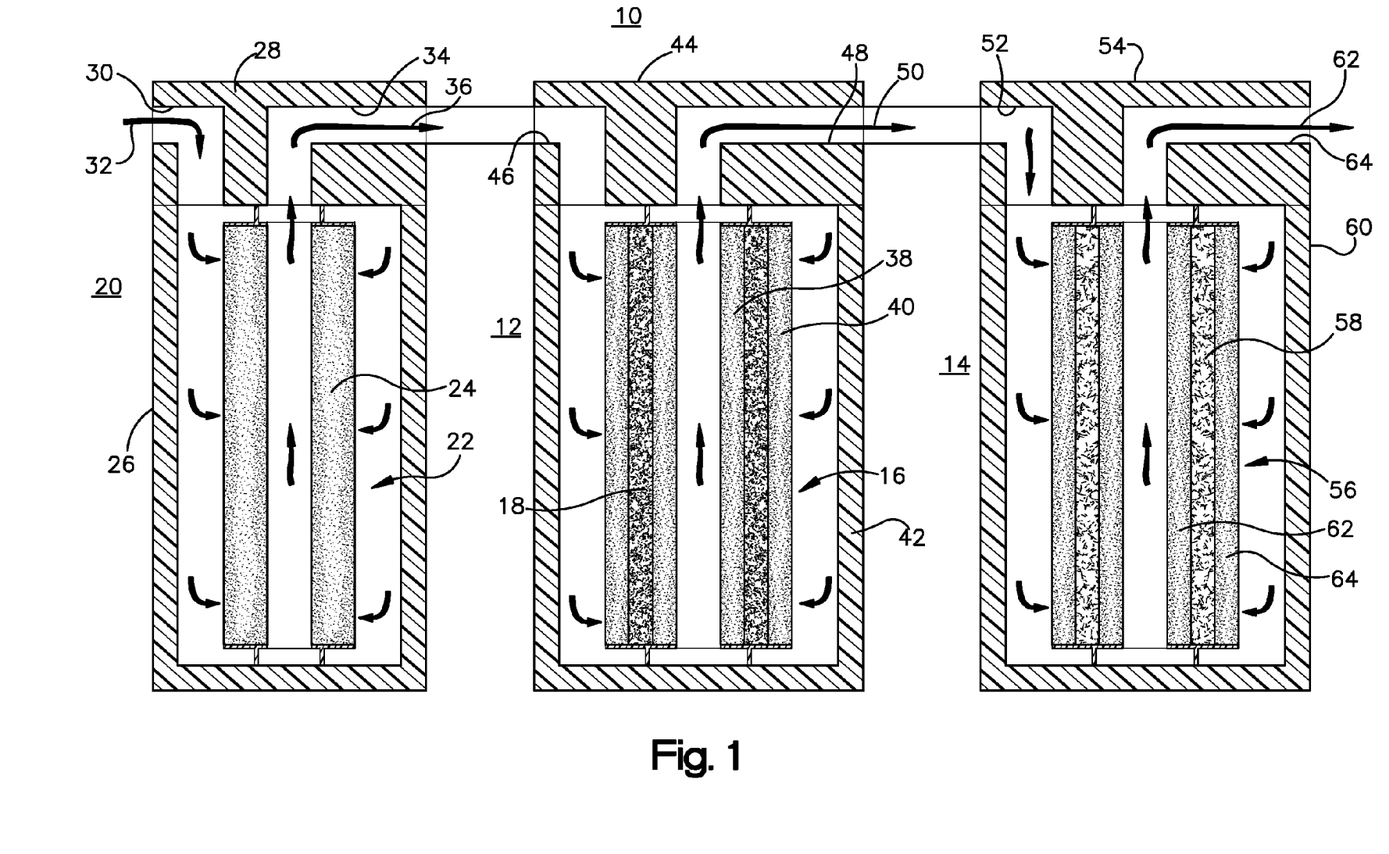
FIG. 1 is a schematic view of a system for treating liquids that is constructed in accordance with the present invention.

Referring to FIG. 1 of the drawings, the inventive system 10 includes a radial flow pH adjuster device 12 upstream of a radial flow liquid treatment device 14 in the liquid flow direction shown by the arrows. The pH adjuster device includes a cartridge 16 containing solid state or particulate pH adjuster material 18. The pH adjuster material raises or lowers the pH of the water or other liquid such that when it passes through the adsorbent media in the downstream liquid treatment device 14, the capacity of the media in removing chemical species from the liquid by adsorption or ion exchange is improved. The invention also includes an optional prefilter device 20 located upstream of the liquid treatment device. The prefilter device (shown as radial flow in the design of FIG. 1) includes a cartridge 22 containing prefilter material 24 that removes suspended particulates from the liquid before it reaches the liquid treatment device.

The prefilter device cartridge 22 contains prefilter material 24 that has openings that allow passage of the liquid but not particulates. The prefilter does not remove dissolved contaminants. The prefilter may remove suspended particles from the liquid having a minimum size of, for example, from about 0.2-5.0 microns. The prefilter device includes a casing 26 in which the cartridge is sealed and disposed in a known manner and a cover 28 that is fastened to the casing. The cover has an inlet 30 that directs influent 32 to the cartridge and an outlet 34 that directs effluent 36 from the device.

The effluent 36 from the prefilter device, having suspended solids removed, travels to the downstream pH adjuster device 12. The pH adjuster device cartridge 16 contains the solid state or particulate pH adjuster material 18, preferably in the form of nonbonded particulate material. The cartridge 16 of the pH adjuster can include a porous polymer containment member, as disclosed in U.S. patent application Ser. No. 10/925,186, filed on Aug. 24, 2004, entitled "Treatment of Liquid Using Porous Polymer Containment Member." The cartridge 16 includes inner and outer tubes 38, 40 made of porous polymer material and end caps as disclosed in the Ser. No. 10/925,186 patent application. The cartridge 16 is sealed and disposed in a casing 42. A cover 44 is fastened to the casing. The cover has an inlet 46 through which the fluid 36 enters the casing and travels to the cartridge, and an outlet 48 that directs liquid 50 from the device. The liquid 50 has a pH that is raised or lowered relative to the pH of the liquid 36, but nevertheless still contains the dissolved substances or contaminants to be removed. In the case of functioning of the device 12 as an acidifier, the pH of the liquid 50 is lowered compared to the pH of liquid 36, while passing through the downstream liquid treatment device 14. In contrast, when functioning as a basifier, the pH of the liquid 50 is raised compared to the pH of the liquid 36, while passing through the downstream liquid treatment device 14.

The liquid 50 travels though inlet 52 in the cover 54 of the liquid treatment device 14, to the cartridge 56 where it is treated by the media 58 to remove chemical species by adsorption and/or ion exchange. The cartridge is disposed and sealed in a casing 60. The cover is connected to the casing in fluid communication with the cartridge as described in the Ser. No. 10/925,186 patent application. The cartridge of the liquid treatment device can include inner and outer tubes 62, 64 comprised of rigid porous polymer used in the liquid treatment device described in the Ser. No. 10/925,186 patent application. The effluent 62 leaves the device 14 through outlet 64 of the cover and has dissolved or small chemical species removed.

The present invention is not limited to the types of liquid treatment device shown in FIG. 1 but is usable with any devices for treating liquid and, in particular, with devices containing adsorbent media whose performance benefits from adjusted pH of the feed liquid, including but not limited to the liquid treatment devices shown in the Ser. No. 10/925,186 patent application. The three-unit system of prefilter, pH adjuster device and liquid treatment device, could include all radial flow units, all axial flow units or different combinations of either. One suitable axial flow cartridge can be obtained from Flowmatic Systems, Inc.

Figure 1A:
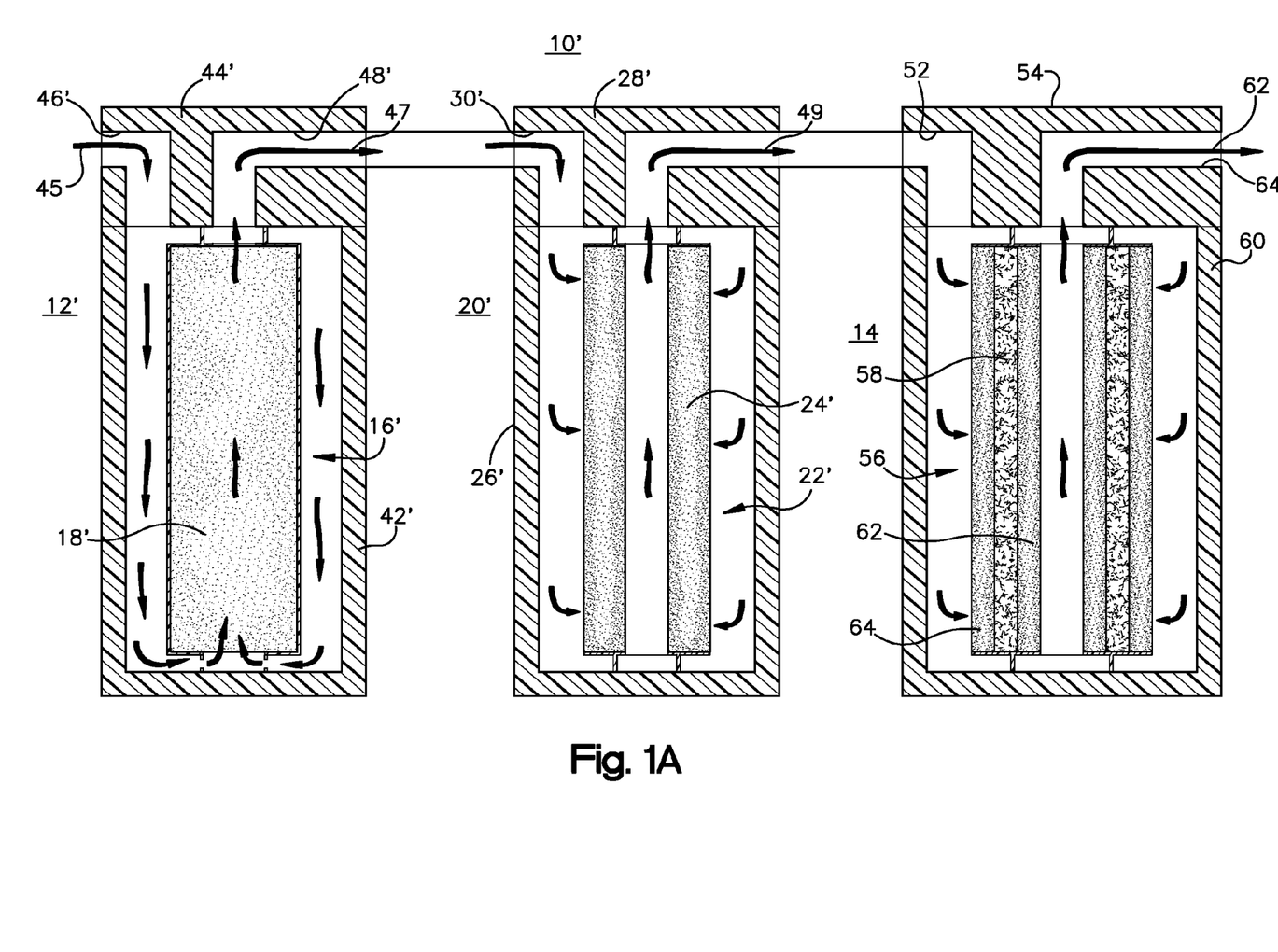
FIG. 1A is a schematic view of another system for treating liquids that is constructed in accordance with the present invention.

A variation of the system of the invention is shown in FIG. 1A where similar, though not necessarily equivalent, parts are identified with similar reference numerals as in FIG. 1 and the same parts are identified with the same reference numerals as in FIG. 1. This system positions the units in order of the pH adjuster 12', the prefilter 20', and the liquid treatment device 14, in the water flow direction shown by the arrows. The pH adjuster shown here is an axial flow device. After the pH of the influent 45 has been raised or lowered by the pH adjuster device to produce liquid 47, particles are removed from the liquid 47 by the radial flow prefilter 20'. From the prefilter, the liquid 49 enters the radial flow liquid treatment device 14, where cations or anions are removed by adsorption or ion exchange, producing treated product liquid 62.

The pH adjuster device as an acidifier increases the lifetime of operation (i.e., capacity) of the adsorbent media of the liquid treatment device in removing arsenic, for example, without breakthrough by at least a factor of about 4. While not wanting to be bound by theory, it is believed that most if not all arsenic adsorption medias perform better, the more pH is lowered. However, environmental regulations limit how low the pH of drinking water can be lowered (e.g., not lower than a pH of 6.5). Also, different acidifier materials will give different pH reduction performance. In drinking water applications, weak acid acidifier materials are used in the invention so that pH is not lowered below pH 6.5. However, in industrial effluent applications, pH can be lowered even more, perhaps to pH 4, subject to other issues including corrosion of the equipment and need to raise pH back up after treatment to satisfy discharge regulations. Such applications may employ strong acid cation exchange resins that tend to lower the pH more than weak acid resins.

The media of the liquid treatment device is expected to require replacement sooner than the pH adjuster material or prefilter material. Upon reaching a predetermined date, or volume of water processed, on which it is recommended to change the liquid treatment cartridge under the particular operating conditions, the user will be instructed to remove all three cartridges and replace them with fresh cartridges.

While not wanting to be bound by theory, arsenic adsorption medias are believed to use two different mechanisms to remove arsenic, adsorption and ion exchange. The adsorption mechanism has a higher capacity than the ion exchange mechanism and predominates at relatively low pH. The ion exchange mechanism predominates at relatively high pH. Determining the pH at which a particular media will exhibit either mechanism and the appropriate pH adjuster material to achieve this pH is well within the ability of one skilled in the art in view of this disclosure.

The performance of the media in removing anions is improved by lowering the pH of the influent using the acidifier while the performance of the media in removing cations is improved by raising the pH of the influent using the basifier. In particular, lowering the pH of the liquid using the acidifier improves the capacity of the media to remove arsenic and other anions from liquids. Raising the pH of the liquid using the basifier improves the capacity of the media to remove cations from liquids.

The basifier raises the pH of the influent to a level (e.g., pH $\geq 9$) that enables the media to perform better in removing cations from the influent. Action of the media in removing cations may tend to lower pH back down again (e.g., below pH 9). While other techniques exist for removing cations without pH adjustment, such as using selective adsorbents, many adsorbent medias are unstable at high pH. One such selective adsorbent media, zirconium phosphate, is more effective than zirconium hydroxide in removing cations, but is unstable above pH 9. The invention would use a media that is stable at pH above 9, such as zirconium hydroxide, in combination with the basifier.

The present invention permits treatment of water in harsh environments that ordinarily could not be treated at all by conventional adsorbent medias in POU and POE applications where using chemical solutions and dosing systems is not economically feasible. When the inventors exposed a variety of types of medias to influent at pH 9.2, the medias were ineffective. They were only able to treat 200-300 gallons of influent before breakthrough. In contrast, using the inventive solid acidifier device upstream of the same media lowered the pH and enabled the media to treat on the order of 2000 gallons before breakthrough.

While not wanting to be bound by theory, mechanisms of the acidifier and basifier in terms of raising or lowering pH will now be described. A mechanism of the acidifier is hydrolytic decomposition of the acidifier compound with the consumption of free OH. Examples of unbonded particulate acidifier material suitable for consuming OH include, but are not limited to, zirconium basic sulfate, zirconium basic carbonate, titanium basic sulfate and combinations thereof. Another mechanism for the acidifier is ion exchange substitution of mobile protons in the acidifier compound by cations from purified solution. Examples of suitable unbonded particulate cation exchange adsorbents in H-form (i.e., acidifier materials) include, but are not limited to, zirconium phosphates, zirconium silicates, titanium phosphates, cation exchange resins (e.g., weak acid carboxylic cation exchange resins, including: AMBERLITE IRC50™, AMBERLITE IRC-76™, AMBERLITE IMAC HP-333™ and AMBERLITE IMAC HP-336™ from Rohm & Haas and LEWATIT S8227™ from Sybron Chemical Inc.; and sulfocationic ion exchange resins), and combinations thereof. Examples of strong acid resins are Rohm & Haas's Amberlite SF120™ and Dowex's 50WX and HCR™. Examples of zirconium phosphate pH adjuster materials are those disclosed in co-pending U.S. patent application Ser. Nos. 10/195,630, and 10/195,876. Reference in this disclosure to "weak" and "strong" acid or base ion exchange resins means the extent of lowering or raising the pH of the liquid that the material can accomplish. For example, a weak acid cation exchange resin will lower pH of the influent less than a strong acid cation exchange resin.

A mechanism of the basifier is consumption of H or addition of OH groups. Suitable basifier materials are anion exchange resins, i.e. strong base anion exchange resins and weak base anion exchange resins. Examples of strong base anion exchange resins are Rohm and Haas IRA 458CL™, Rohm and Haas IRA 743™, Rohm & Haas Amberlite PWA 410™, Rohm & Haas IRA410™, Rohm & Haas AP143™, Dowex Marathon A™, Dowex 1X™ and Dowex Marathon 11™. An example of a weak base anion exchange resin is Duolite A7™.

The pH adjustor material is a solid state or particulate material, either bonded or nonbonded, wet or dry. The pH adjustor material in either a radial flow cartridge, axial flow cartridge, or media bed in a vessel, can be charged into the cartridge or vessel or removed from the cartridge or vessel either dry or as a slurry, but it is a solid state material while the device is in service. A preferred pH adjuster material in service is in the form of a nonbonded particulate.

The adsorbent media in either a radial flow cartridge, axial flow cartridge, or media bed in a vessel can be charged into the cartridge or vessel or removed from the cartridge or vessel either dry or as a slurry, but it is a solid state or particulate material while the device is in service. A preferred media for use in a radial flow liquid treatment device in service is in the form of a wet nonbonded particulate having relatively small particle size. A preferred media for use in an axial flow cartridge or media bed in a vessel in service is in the form of a particulate having relatively large particle size. The nonbonded particulate media may take the form of a powder, paste, beads, granules or other particulate form. The media may be made by being ground, granulated, precipitated, evaporated from a solution by spray drying or other drying technique, by attaching to a particulate substrate, or by other means known to the art or disclosed in U.S. Pat. No. 6,383,395 and U.S. patent application Ser. No. 10/195,875 (e.g., hydrous zirconium oxide), which are incorporated herein by reference for all purposes in their entireties. The terms nonbonded particulate mean that the media or pH adjuster material includes particles that are not cast, molded or embedded in a paper, membrane or other matrix, or otherwise bonded together so as to be fixed in place. The term nonbonded does not imply that the media or pH adjuster material must be used in a cartridge and the invention is not limited to use of cartridges. The term nonbonded does not exclude media or pH adjuster material incorporated in or onto movable supports including but not limited to, resin beads. In some applications, such as axial flow and deep bed vessel devices, resinous or otherwise relatively large particle size media would be suitable. Preferred media for radial flow filtration, such as hydrous zirconium oxide, does not employ resin and are not formed as resin beads because this can limit reactivity. The bed of media or pH adjuster material may be a layer with an aspect ratio as defined in the U.S. Pat. No. 6,383,395 patent, a bed of two or more feet in depth, a column or other shape.

The adsorbent media of the liquid treatment device may comprise metal hydroxides or metal oxides. In particular, the media is based on one of zirconium, titanium or iron, and combinations thereof. A particularly preferred media is selected from the group consisting of zirconium dioxide, hydrous zirconium oxides, granular ferric hydroxide, hydrous ferric oxides, sulfur modified iron, hydrous titanium oxides, titanium dioxide, crystalline anatase as disclosed in US 2003/0155302, which is incorporated herein by reference in its entirety, activated alumina and combinations thereof. Other suitable media, which is supplied by Magnesium Elektron Inc., is amorphous hydrous zirconium oxide having a pore size distribution ranging from 20 to 40 Å, a surface area of at least 150 m$^2$/g, an average particle size of at least 10 microns, and a stability against moisture loss characterized by a capacity and selectivity for chemical species that does not decrease more than 20% across a moisture content LOD ranging from 0<LOD<40%, as described in U.S. patent application Ser. No. 10/195,875; and media described in U.S. Pat. No. 6,383,395.

The media of at least the Ser. No. 10/195,875 application and U.S. Pat. No. 6,383,395 patent can remove arsenic to levels under 10 parts per billion (ppb), and in particular, to levels not greater than 2 ppb billion, after a single pass of the liquid through the media. This media can remove arsenic from liquid to undetectable levels as evaluated by atomic adsorption using a graphite furnace. The average particle size of such media can be up to about 50 microns and, in particular, in the range of about 5-50 microns.

Although the media is characterized by an ability to remove arsenic-containing species from liquid, it may remove other species instead of or in addition to arsenic-containing species. The media can remove anionic chemical species selected from the group consisting of: chromium(VI), selenium, boron, phosphates, and combinations thereof. The media can also remove cationic chemical species including lead, cadmium, copper, barium, strontium, thallium and combinations thereof. The adsorbent medias described in this disclosure remove both the indicated cations and anions listed above. Chemical species that may be removed by the media are discussed in U.S. Pat. No. 6,383,395 and U.S. patent application Ser. Nos. 10/195,875. Reference to chemical species, anionic chemical species and cationic chemical species, and the like encompasses species in the form of free ions as well as neutral or charged compounds that include the species of interest and other atoms. For example, dissolved arsenic may be present in water as $H_2AsO_4^-$.

The media removes chemical species from solution by adsorption and/or ion exchange. Such species may be dissolved small molecules or compounds having a molecular weight less than 1000 and usually not more than 100.

The invention may advantageously be usable for treating a variety of liquids including drinking water, aqueous liquids, industrial effluents, industrial process streams, contaminated ground water, beverages, wines, and liquors. The invention may be used on a commercial scale such as for treating drinking water in one or more households or in a community.

The liquid treatment device can include a radial flow cartridge containing the media as disclosed in co-pending application Ser. No. 10/925,186. The system of the present invention may be mounted to plumbing for providing drinking water and operate at household water pressure.

The invention may also be used in POE and central water treatment services. In POE service one or more of the liquid treatment devices can be mounted at the water inlet to a household and used to treat all of the water consumed within the household. In this application, the pH adjuster may be in the form of a single vessel containing a bed of the pH adjustor material or two or more devices. Similarly, the liquid treatment device can be used in central water treatment service in the form of one or more larger scale devices located at a well serving a community or group of households. In this application, the pH adjustor may be in the form of a single vessel containing a bed of the pH adjustor material or two or more devices. The number of pH adjuster devices and liquid treatment units that will be required depends on, inter alia, the particle size of the material, flow rate of the influent and size of the bed of material. If relatively small particle size material is used (e.g., an average particle size of up to 50 microns), a greater number of devices in a bank will be used (e.g., banks of up to 4 devices for POE service, and 20 devices for central treatment service) compared to use of fewer devices when relatively large particle size material is used (e.g., an average particle size of at least 0.1 mm). The above numerical values provided for the relatively small particle size material and the relatively large particle size material apply throughout this disclosure.

A preferred example of a three device system includes: an acidifier device having a cartridge containing Lewatit brand S8227™ weak acid cation exchange resin, Amberlite™ brand IRC-76 carboxylic cation exchange resin supplied by Rohm and Haas, or IMCA HP-333™ weak acid cation exchange resin supplied by Rohm and Haas; a prefilter device having a cartridge containing standard prefilter material or other prefilter material such as activated carbon prefilter material 24 (e.g., KDF™ brand activated carbon supplied by Flowmatic, Inc.); and a radial flow liquid treatment device as disclosed in the 10/925,186 application having a cartridge containing 302M grade™ hydrous zirconium oxide non-bonded particulate media supplied by Magnesium Elektron, Inc. The S8227™ and HP-333™ acidifier materials are the only two weak acid cation exchangers known to the inventors that currently have NSF certification for drinking water and are usable in drinking water applications.

The following example is directed to an acidifier-based system and to a comparative non-acidifier-based system. The acidifier-based system was a three-cartridge system including, in order from upstream to downstream: an axial flow prefilter cartridge containing KDF™ activated carbon supplied by Flowmatic, Inc., an axial flow acidifier cartridge containing Amberlite™ IRC 50 carboxylic cation exchange resin supplied by Rohm and Haas, and a radial flow water treatment cartridge using porous polymer tubes as disclosed in the 10/925,186 application, which contained 302M grade™ nonbonded particulate hydrous zirconium oxide media supplied by Magnesium Elektron, Inc. The comparative, non-acidifier-based system employed standard 1.0 micron filter paper in a cartridge in place of the acidifier cartridge, but used the same water treatment and prefilter cartridges as the 3 cartridge acidifier-based system. The concentration of the As(V) contaminant in the influent was about 50 ppb.

The invention will now be described by reference to the following non-limiting examples.

COMPARATIVE EXAMPLE

Figure 2:
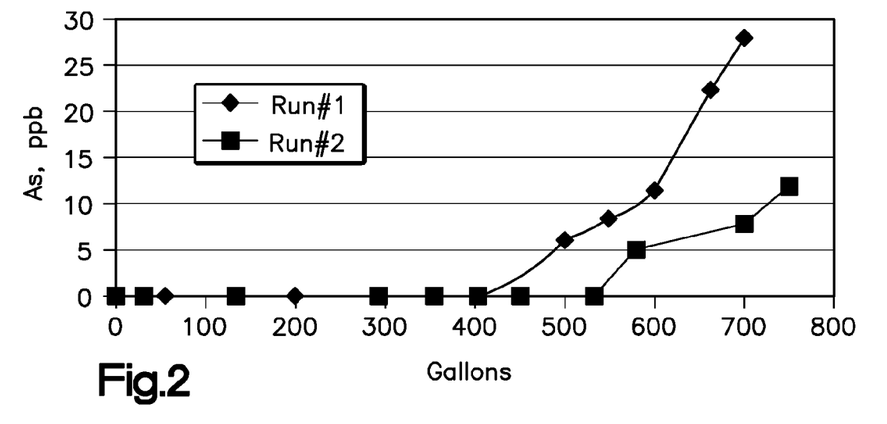
FIG. 2 is a graph showing early breakthrough in two separate runs in a liquid treatment device that did not use the pH adjuster device of the present invention.

FIG. 2 shows that without the inventive acidifier, arsenic breakthrough occurred after about 600 gallons. This was confirmed by two duplicate runs as shown in the figure.

EXAMPLE

Figure 3:
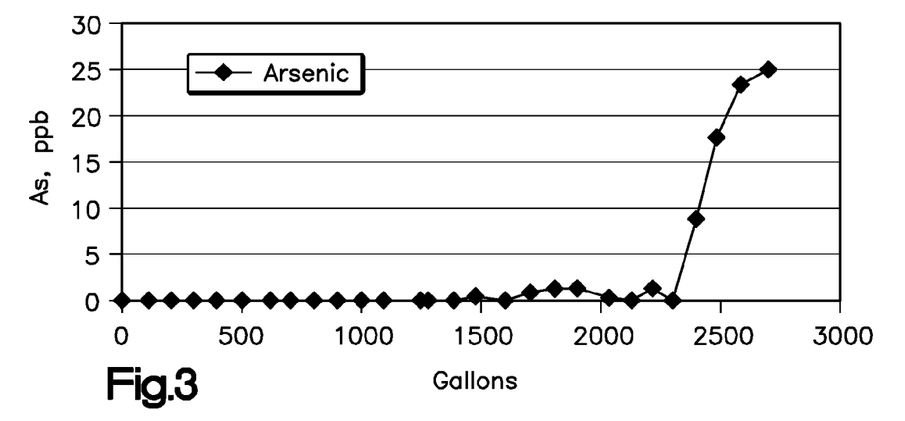
FIG. 3 is a graph showing increased capacity in a liquid treatment device when used in conjunction with the pH adjuster device of the present invention.

As shown in FIG. 3, using the acidifier upstream of the water treatment cartridge resulted in breakthrough of arsenic through the media after treatment of about 2400 gallons of water, which is much later compared to the Comparative Example. Using the acidifier according to the invention increased the capacity of the media to adsorb more arsenic. The life of the water treatment cartridge was increased by about a factor of 4 (from about 600 to about 2400 gallons).

Figure 4:
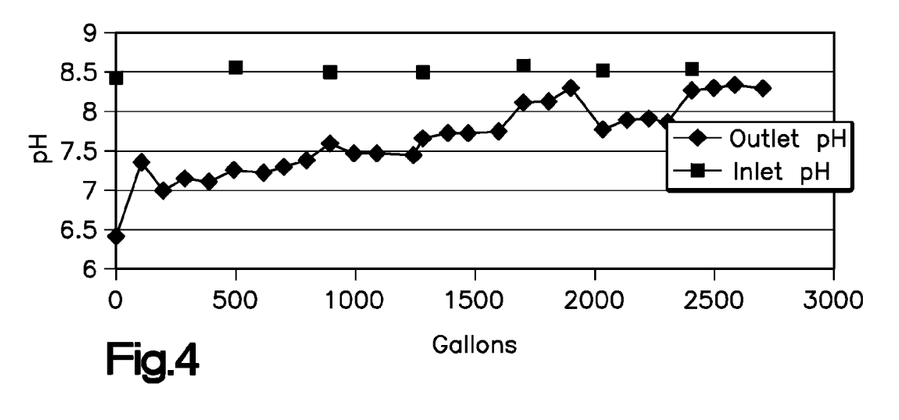
FIG. 4 shows gradual increase in product water pH from an inventive system including a prefilter, pH adjuster device and liquid treatment device, as a function of gallons of product water treated.

FIG. 4 shows that the influent had an inlet pH of 8.5 before any treatment. The outlet pH of the effluent or product water out of the system that is described above, was decreased initially to about pH 6.5, within the range permitted by government regulations for drinking water, and then gradually increased as a greater volume of water was treated. As the chemical effects of the acidifier were exhausted, the pH gradually increased. FIG. 4 shows that as more water was treated and the acidifier material was used up, the effluent gradually returned to the starting pH of the influent.

Figure 5:
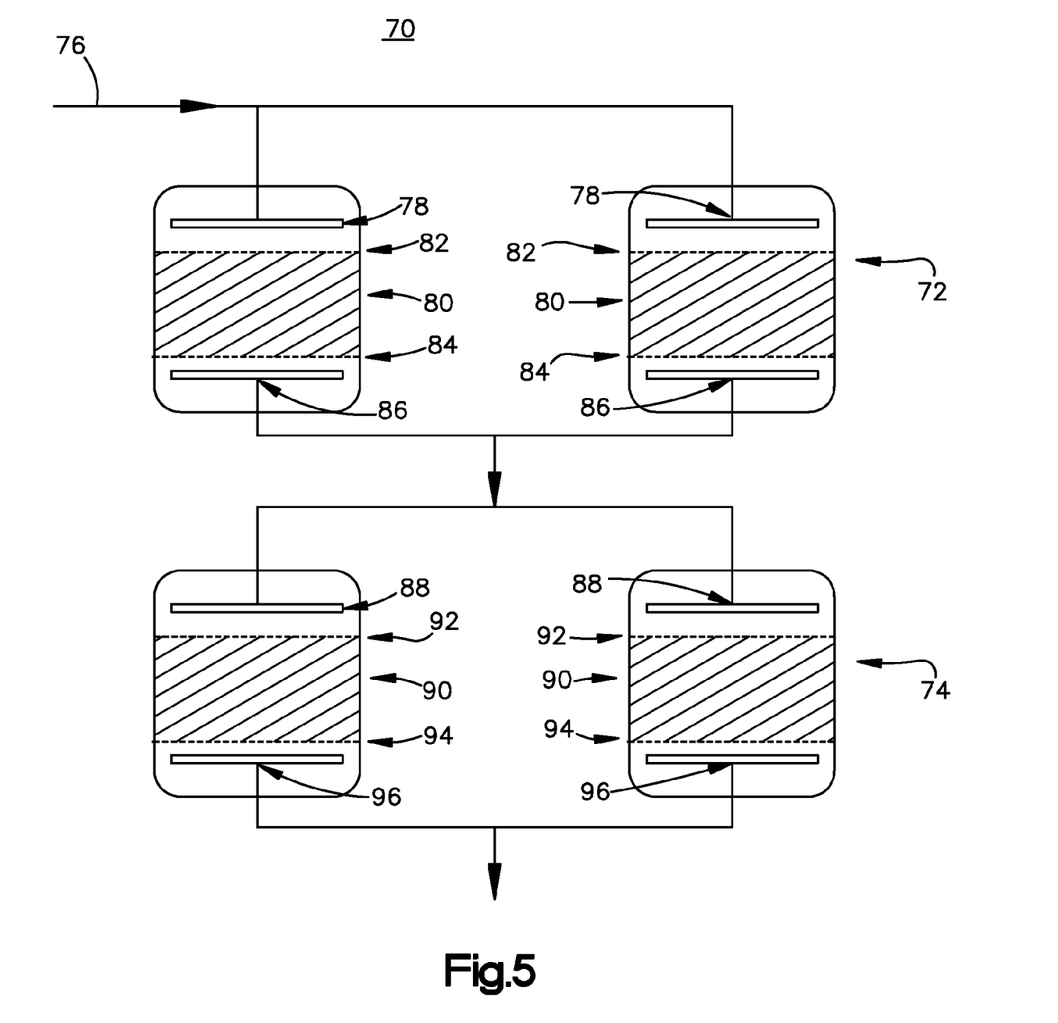
FIG. 5 is a schematic view of a system constructed in accordance with the present invention having multiple units.

Another embodiment of the present invention is shown in FIG. 5. The system 70 employs a first set of pH adjuster devices 72 in parallel and a second downstream set of liquid treatment devices 74 in parallel relative to liquid flow 76 that travels in a direction shown by the arrows. Both sets of the devices employ a relatively deep bed of material, which is possible in view of the relatively large particle size of the material that is used. Examples of a minimum depth and a minimum diameter of the material in the bed in such vessels are: at least about 2 feet deep and at least about 1 foot diameter (POE) and at least about 4 foot deep and at least about 4 foot diameter (central treatment). An example of a minimum, relatively large particle size of material for such a vessel is at least about 0.1 mm. Each pH adjuster device includes an inlet liquid distribution manifold 78 for distributing the liquid evenly across the pH adjuster material 80 adjacent the first screen 82. The pH adjuster material is contained between the first screen and a second screen 84. The pH of the liquid is raised or lowered depending on whether acidifier or basifier material 80 is used in the pH adjuster device. The liquid then leaves the device through an outlet liquid collection manifold 86 and enters the set of liquid treatment devices 74.

Each liquid treatment device includes an inlet liquid distribution manifold 88 for distributing the liquid across the adsorbent media 90 adjacent a first screen 92. The media is contained between the first screen and a second screen 94. Chemical species are removed from the liquid by the media via adsorption or ion exchange mechanisms and the product water leaves the device via the outlet liquid collection manifold 96.

Suitable adsorbent media for this embodiment of the present invention includes, but is not limited to: zirconium dioxide, granular ferric hydroxide, hydrous ferric oxides, sulfur modified iron, titanium dioxide, crystalline anatase and activated alumina. Hydrous zirconium oxides and hydrous titanium oxides such as disclosed in the U.S. Pat. No. 6,383,395 patent and in U.S. patent application Ser. No. 10/195,875, may also be used in this device if they are designed to have a relatively large particle size such as when incorporated on or in supports including resin beads. For example, hydrous titanium oxide that is disposed on or in supports such as beads having relatively large particle size can be used in such vessels. The system 70 can be used in the applications and to treat the various liquids described in this disclosure. One suitable application is removing arsenic from drinking water.

Although the invention has been described in its preferred form with a certain degree of particularity, it will be understood that the present disclosure of preferred embodiments has been made only by way of example and that various changes may be resorted to without departing from the true spirit and scope of the invention as hereafter claimed.

What is claimed is:

1. A method for removing a substance from liquid, comprising:

passing liquid containing a substance to be removed into a pH adjuster device, said pH adjuster device containing solid state pH adjuster material;

releasing from said pH adjuster material H or OH groups into the liquid or consuming with said pH adjuster material H or OH groups from the liquid effective to raise or lower the pH of the liquid, at a generally fixed location relative to a liquid treatment device;

passing the liquid having the raised or lowered pH into said liquid treatment device that is located downstream of said pH adjuster device relative to a direction of flow of the liquid, said liquid treatment device comprising adsorbent media; and removing the substance from the liquid with said media by a mechanism selected from the group consisting of adsorption, ion exchange and combinations thereof.

2. The method of claim 1 wherein passing the liquid into said liquid treatment device at said lowered pH increases a capacity of said media to remove arsenic-containing chemical species from the liquid by at least about a factor of 4.

3. The method of claim 1 comprising releasing H or consuming OH groups from the liquid via said pH adjuster material effective to lower the pH of the liquid.

4. The method of claim 3 comprising removing arsenic-containing chemical species from the liquid with said media to levels under 2 parts per billion.

5. The method of claim 4 wherein the liquid is drinking water.

6. The method of claim 3 wherein said media is selected from the group consisting of zirconium-based media, iron-based media, titanium-based media and combinations thereof.

7. The method of claim 3 comprising hydrolytically decomposing said pH adjuster material so as to consume said OH from the liquid.

8. The method of claim 7 wherein said pH adjuster material is selected from the group consisting of zirconium basic sulfate, zirconium basic carbonate, titanium basic sulfate, and combinations thereof.

9. The method of claim 3 comprising conducting ion exchange substitution of protons from said pH adjuster material into the feed liquid.

10. The method of claim 9 wherein said pH adjuster material is selected from the group consisting of zirconium phosphates, zirconium silicates, titanium phosphates, cation exchange resins and combinations thereof.

11. The method of claim 3 comprising removing chemical species from the liquid with said media, said chemical species being selected from the group consisting of arsenic, chromium(VI), selenium, boron, phosphates and combinations thereof.

12. The method of claim 1 comprising releasing OH groups or consuming H from the liquid using said pH adjuster material effective to raise the pH of the liquid as it passes said media.

13. The method of claim 12 comprising removing chemical species from the liquid with said media, said chemical species being selected from the group consisting of lead, cadmium, copper, barium, strontium, thallium and combinations thereof.

* * * * *